Patented June 21, 1949

2,473,549

UNITED STATES PATENT OFFICE 2,473,549

METHOD OF POLYMERIZING VINYLIDENE COMPOUNDS IN AQUEOUS MEDIUM IN THE PRESENCE OF SILVER ION AND OXALATE ION

Grant W. Smith, Grand Forks, N. Dak., assignor to The B. F. Goodrich Company, New York, N. Y., a corporation of New York No Drawing. Application October 11, 1947, Serial No. 779,413

6 Claims. (Cl. 260—84)

This invention relates to the polymerization in aqueous emulsion of unsaturaed compounds containing the $CH_2=C<$ group, that is, monomeric vinylidene compounds, either alone, in admixture with one another or with other unsaturated materials, and pertains particularly to the use in such polymerization of an activator consisting of a combination of silver ion with oxalate ion. The invention more specifically relates to the polymerization in aqueous medium, in the presence of such an activator, of mixtures of monomeric materials, each component of which is a monoolefinic vinylidene compound (containing only one carbon to carbon unsaturated bond) such as vinyl chloride, vinylidene chloride, vinyl cyanide (acrylonitrile), vinyl aceate, methyl acrylate, ethyl acrylate, methyl methacrylate, or the like.

It is well known that vinylidene compounds can be polymerized in aqueous emulsion in the presence of catalyzing substances, emulsifying agents, buffers, modifiers and the like, to form polymers predominantly linear in character, and obtained either as stable dispersions or latices or as fine granular solids. It is known, for example, that mixtures of butadiene-1,3 and styrene can be polymerized in aqueous emulsion in the presence of a small quantity of potassium persulfate as a catalyst, a small quantity of dodecyl mercaptan as a modifier and a small quantity of silver nitrate as activator, to produce a yield of polymer of about 40% in 15 to 18 hours at 40° C. Other known polymerization methods, including those developed for polymerization of mixtures of monoolefinic vinylidene compounds such as mixtures of vinyl chloride and alkyl acrylates, require 40 or even 60 or more hours for completion at this temperature. Furthermore, the known methods of catalysis of the vinylidene compounds suffer from the disadvantage that the polymerization does not start immediately but exhibits an "induction period" or lag often as long as 20 or even 30 or more hours in the commencement of polymerization.

I have now discovered that vinylidene compounds in general, and preferably monomeric mixtures of monoethylenic monomers such as vinyl chloride and the alkyl acrylates, may be polymerized very rapidly and efficiently at moderate temperatures to obtain high yields of polymers having excellent properties if the polymerization is carried out in aqueous medium in the presence of small amounts of a polymerization catalyst comprising a peroxygen compound, preferably a water-soluble persulfate, and in the additional presence of small amounts of a polymerization activator comprising a compound ionizable to yield silver ion such as silver nitrate and of a compound ionizable to yield oxalate ion, such as oxalic acid itself or ammonium oxalate. By the use of the silver-oxalate activator the induction period may be greatly reduced or entirely eliminated and high yields of 90 to 100% obtained.

When using this activator, the reaction temperature is not critical and may vary widely from as low as 10° C. or lower to as high as 100° C. or higher, though generally, polymerization of the preferred monomeric materials according to this invention is effected at 20° to 60° C. with a great reduction in the length of the induction period.

The amount of peroxygen catalyst for use in conjunction with the silver-oxalate activator of this invention is likewise not critical but may vary from 0.1% to 0.5% or 1% or even as high as 5% (based on the monomers) but, generally, the use of 0.2 to 0.7% of a water-soluble persulfate such as ammonium, sodium or potassium persulfate is preferred. Other well known peroxygen compounds such as hydrogen peroxide, benzoyl peroxide, alkali metal perborates, and percarbonates and the like may be substituted for the persulfates but the persulfates give far better results and are greatly preferred.

The speed of the polymerization reaction varies in accordance with the amount of ionizable silver salt added to the reaction mixture and the rate increases with an increase in added silver salt. For example, as little as 0.0005% of silver nitrate (on the water phase) will produce a definite accelerating effect on the copolymerization of a mixture containing 90% by weight of vinyl chloride and 10% by weight of ethyl acrylate, and the accelerating effect rapidly increases as the amount of silver nitrate is increased to 0.02% but the effect decreases with higher silver nitrate concentrations. Similar results are shown in the polymerization of other monomers and as a general rule concentrations of 0.01 to 0.10% silver nitrate on the water phase will be found to produce fastest reaction but amounts varying from 0.0005 to 0.5% may be used to advantage.

The amount of water-soluble oxalate necessary in conjunction with the silver activator to obtain rapid polymerization is not critical but the presence of some oxalate appears to be necessary to obtain greatest activation effects. For example, the polymerization of vinyl chloride alone does not progress satisfactorily at 40° C. After more than 48 hours in the presence of silver nitrate and absence of a soluble oxalate but as little as 0.05 or 0.10% of a soluble oxalate has such a pronounced effect on the activity of the silver activator that the induction period may be shortened from 25 to 35 hours to as little as 2 to 5 or 10 hours. Generally, however, the addition of higher amounts such as 0.3% to 1.0% or even 2.0% or more of a soluble oxalate (based on the monomers) or 0.3 to 0.7% (based on the aqueous phase) is sufficient to speedily complete polymerization of the preferred monomeric materials at temperatures of 20 to 60° C.

The oxalate ion of the silver-oxalate activator of this invention may be supplied by any soluble oxalate ion yielding substance such as oxalic acid itself, sodium oxalate, potassium oxalate, ammonium oxalate, lithium oxalate, cesium oxalate, berylium oxalate, and others. In addition, oxalate ion may be supplied by oxalic acid which has been neutralized to any desired degree by ammonia. The latter method is advantageous because it offers a means of introducing a pH buffer. In any case, the nature of the cation is not critical for it appears that the oxalate ion $(C_2O_4)^-$ is the active agent and it is believed that oxalate ion and silver ion react to form a complex analogous to the silver ammonia complex $Ag(NH_3)_2^+$.

The above concentrations are based on the addition of silver nitrate and a soluble oxalate such as oxalic acid, to the aqueous medium either before or after addition of the material to be polymerized. This however is not the only method of producing silver ion in the polymerization mixture since such ions are formed by adding other water-soluble or sparingly soluble silver compounds such as silver sulfate, silver acetate, silver nitrite, silver fluoride, silver chlorate or silver lactate or oxalate to the reaction mixture together with the soluble oxalate. Even metallic silver and insoluble silver compounds such as the chloride, bromide and carbonate may be used when a soluble persulfate such as sodium or potassium persulfonate is present since in the presence of the persulfate a sufficient amount of the insoluble silver compound will dissolve and enough of the silver-oxalate activator will be formed to accelerate the polymerization. In addition, the silver-oxalate activator may be formed outside the reaction medium and added as such thereto, for example, by dissolving silver chloride in a solution of sodium persulfate and adding oxalic acid, sodium oxalate or some other soluble oxalate thereto. In all these alternative methods, the concentration of silver which should be used is that which is chemically equivalent to the amounts of silver nitrate set forth above.

Polymerization of monomeric material according to the method of this invention may be performed in an aqueous medium in the presence of an efficient emulsifying agent so as to obtain the polymer in the form of a latex or dispersion. Examples of emulsifying agents which may be used include the fatty acid soaps such as sodium oleate, potassium palmitate, sodium stearate, sodium myristate and the like; and the synthetic saponaceous materials such as the hymolal sulfates and alkaryl sulfonates including, for example, sodium lauryl sulfate, sodium isopropyl naphthalene sulfonate, and the sodium salts of alkyl naphthalene or benzene sulfonic acids; the sodium salt of N-octadecyl-N-1,2-dicarboxyethyl sulfosuccinamate, and others. Gelatin, fine bentonite clays, and other colloidal protective materials may also be used. The nature of the emulsifying agent is not critical for in any case stable dispersions of polymer are obtained by the use of the silver-oxalate activator of this invention in an aqueous medium in the presence of an emulsifying agent.

Alternatively, polymerization of the monomeric material in the presence of the silver-oxalate activator of this invention may be effected in an aqueous medium in the absence of any added emulsifying agent. In the absence of an emulsifier, polymerization proceeds smoothly and rapidly to high yields and the polymer is usually obtained in an granular condition which facilitates separation of the polymer from the aqueous phase.

In either event (whether emulsifier is present or absent) it is preferred that the amount of water present be 1 to 5 times that of the monomeric material and that the reaction mixture be agitated constantly during the time that polymerization is taking place so as to insure efficient distribution of the monomeric material throughout the aqueous phase.

The polymerization is preferably carried out in the absence of gaseous or molecular oxygen for it has been observed that the presence of even a small amount of molecular oxygen will cause an appreciable "induction period" or lag in the commencement of polymerization. Accordingly, it is preferred that the monomeric materials be freshly distilled shortly before use or stored under an inert atmosphere in order to prevent absorption of oxygen. It is also preferred, if a closed reactor is used, that the reactor be evacuated and/or supplied with an inert atmosphere such as nitrogen before charging the reaction mixture. If polymerization is effected continuously as in a "pipe line" appropriate precautions are preferably taken to exclude oxygen from the reaction mixture.

The new silver-oxalate activator of this invention may be employed in conjunction with various other polymerization expedients. For example, in polymerizations involving vinyl chloride or vinylidene chloride buffer salts such as sodium bicarbonate or sodium meta silicate may be added to the reaction mixture and in the polymerization of the dienes to form synthetic rubber-like materials polymerization modifiers such as the alkyl mercaptans may be added. As other expedients, the entire mixture of monomers is not added to the reaction mixture at the start of the polymerization but is added to the reaction vessel in a continuous manner or in increments during the reaction or one or more of the more readily polymerizable monomers is added in increments or at a uniform rate over the reaction period. Moreover, the catalyst or silver-oxalate activator may be added gradually or in small increments during the progress of the polymerization. In addition, the activator may be added gradually or in small increments during the progress of the polymerization. Addition of activator in a gradual manner may be effected by coating the added metallic silver or silver compound with collodion or depositing it on silica gel carrier so as to permit gradual diffusion of silver and formation of silver ions during the course of the reaction.

The method of this invention is applicable generally to the polymerization of unsaturated compounds containing the $CH_2=C<$ group, that is, vinylidene compounds or compounds containing a terminal methylene group attached by a double bond to a carbon atom. Examples of such compounds include vinylidene compounds containing only one carbon to carbon unsaturated bond such as vinyl chloride, vinylidene chloride, styrene, p-chlorostyrene, 3,5 - dichlorostyrene, p-methoxy styrene, acrylonitrile, methacrylonitrile, alpha-chloro acrylonitrile, methyl acrylate, ethyl acrylate, methyl methacrylate, butyl ethacrylate, methacrylamide, vinyl methyl ketone, vinyl pyridine, vinyl carbazole, vinyl methyl ether, vinyl acetate, vinyl benzoate, isobutylene, ethylene, and other similar monoolefinic polymerizable compounds. Other vinylidene compounds containing more than one unsaturated linkage which may be polymerized in the presence of the silver-oxalate activator include the conjugated dienes such as butadiene-1,3, isoprene, and the other butadiene-1,3 hydrocarbons, chloroprene and 3-cyano butadiene-1,3, as well as trienes such as myrcene and compounds containing olefinic and acetylenic bonds such as vinyl acetylene, vinyl ethynyl diethyl carbinol and the like. The above vinylidene compounds may be copolymerized with one another or with still other unsaturated polymerizable materials such as diethyl maleate, diethyl fumarate, maleic acid or anhydride or the like.

It will be understood from the above examples that vinyl compounds are a sub-genus of vinylidene compounds since they contain the characteristic $CH_2=S<$ structure, one of the valences being connected to hydrogen to form the vinyl

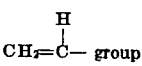

group

The silver oxalate activator of this invention is particularly applicable to the polymerization of mixtures of monomeric materials each component of which is a vinylidene compound containing only one carbon to carbon unsaturated linkage, and especially to mixtures of monomers each of which is a compound of the structure

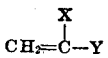

wherein X represents hydrogen, halogen, cyano, carbalkoxy or acyloxy and Y represents halogen, carbalkoxy, or acyloxy. Illustrative compounds represented by the above general structure are vinyl chloride, vinyl bromide, vinyl fluoride, vinyl iodide, vinyl acetate, vinyl propionate, vinyl butyrate, vinyl benzoate, vinylidene chloride, vinylidene bromide, vinylidene chlorofluoride, methyl acrylate, ethyl acrylate, methyl methacrylate, ethyl ethacrylate, butyl ethacrylate, acrylonitrile, methacrylonitrile, methyl alpha-cyano acrylate, ethyl alpha-chloro acrylate, and others.

The invention will be further described by the following specific examples which are intended to be merely illustrative of the invention and not a limitation thereon.

EXAMPLES 1 TO 4

The silver-oxalate complex activator is utilized to great advantage in the copolymerization of mixtures of vinyl chloride and the alkyl acrylates such as methyl acrylate. According to this example, emulsions are prepared containing the following mixtures of materials and then sealed into glass polymerization tubes under an atmosphere of nitrogen and then agitating the tubes by rotating them end over end in a water bath maintained at 40° C.

|  | Parts |
|---|---|
| Vinyl chloride | 80 |
| Methyl acrylate (distilled) | 20 |
| Potassium persulfate | 0.5 |
| Emulsifier [1] | 4.0 |
| Other substances (see Table I) | Variable |
| Water | 196.0 |

[1] Sodium salt of N-octadecyl-N-1,2-dicarboxyethyl sulfo-succinamate.

Table I below presents reaction data including the substances added to the basic recipe given above, the length of the induction period, the total time of reaction and the yield obtained.

*Table I*

|  | Parts by weight | | | | Time, Hours | | Yield, Per cent |
|---|---|---|---|---|---|---|---|
|  | Oxalic Acid | Sodium Oxalate | Ammonium Oxalate | Silver Nitrate | Induction Period | Total [1] |  |
| Example 1 |  |  |  |  | 31½+ |  |  |
| Example 2 | 0.75 |  |  | 0.04 | 7+ | 22⅚ | 82 |
| Example 3 |  | 0.80 |  | 0.04 | 7+ | 22⅚ | 89 |
| Example 4 |  |  | 0.85 | 0.04 | <5 | 22⅓ | 84 |

[1] Time when tubes were opened.

It is to be noted that in the absence of silver nitrate and a soluble oxalate no reaction took place within 31½ hours but in contrast, those polymerizations conducted in the presence of only about 0.02% silver nitrate and 0.38 to 0.43 part of a soluble oxalate (based on the aqueous phase) reduced the induction period from over 30 to about 5 to 7 hours and so greatly increased the rate of polymerization that as much as 89% yield could be obtained within 22⅚ hours or less.

EXAMPLES 5 TO 9

The silver-oxalate activator of this invention may be utilized to accomplish the polymerization of monomeric vinyl chloride in the absence of a comonomer. Emulsions are prepared according to the recipe of Example 1 except for the substitution of 100 parts of monomeric vinyl chloride for the monomeric mixture of vinyl chloride and methyl acrylate, and subjected to polymerization in glass tubes at 40° C. according to the procedure described in Example 1. Table II below presents reaction data including the substances added to the basic recipe given in Example 1, the length of the induction period, the total time of reaction (time when tubes were opened) and the yield obtained.

Table II

| | Parts by Weight | | | | Time, Hours | | |
|---|---|---|---|---|---|---|---|
| | Oxalic[2] Acid | Sodium Oxalate | Ammonium Oxalate | Silver[2] Nitrate | Induction Period | Total[1] | Yield |
| Example 5 | | | | 0.04 | >48 | 71¼ | 70% |
| Example 6 | 0.75 | | | 0.04 | <5 | >48 | 98% |
| Example 7 | | 0.80 | | 0.04 | 20% in 23 hours | >71¼ | 84% |
| Example 8 | | | 0.85 | 0.04 | <3½ | lost | lost. |
| Example 9 | | | 0.85 | 0.04 | <5 | >30½ | 96%. |

[1] Time when tubes were opened.
[2] Parts per 100 parts of monomers.

It is to be noted that polymerization of vinyl chloride in polymerization mixtures containing no silver nitrate exhibits an induction period greater than 48 hours and yielded only 70% in 71¼ hours. When, however, as little as 0.75 to 0.85 part of a soluble oxalate per 100 parts of monomers and 0.04 part of silver nitrate per 100 parts of monomers are added to the reaction mixture the induction period is reduced to as low as 3½ to 5 hours and the polymerization proceeds smoothly to yields of 96 to 98%. Similar results may be obtained in the polymerization of monomeric materials such as mixtures of vinyl chloride and vinylidene chloride, mixtures of vinylidene chloride and the alkyl acrylates, mixtures of butadiene-1,3 and styrene or acrylonitrile and mixtures containing the other vinylidene compounds mentioned hereinabove.

While there has been disclosed with considerable detail certain preferred manners of performing this invention, it is not intended or desired to be solely limited thereto, for as hitherto stated the procedure may be modified, the precise proportions of the materials utilized may be varied, and other materials having equivalent properties may be employed if desired without departing from the spirit and scope of the invention as defined in the appended claims.

I claim:

1. The method which comprises polymerizing a vinylidene compound in an aqueous medium comprising a compound ionizable to yield silver ion, a compound ionizable to yield oxalate ion and a peroxygen compound, and in the absence of substantial amounts of gaseous oxygen.

2. The method which comprises polymerizing a vinylidene compound in an aqueous medium comprising silver nitrate, ammonium oxalate and a peroxygen compound, and in the absence of substantial amounts of gaseous oxygen.

3. The method which comprises polymerizing a monomeric mixture each component of which is a vinylidene compound containing only one carbon to carbon unsaturated linkage in an aqueous medium comprising a compound ionizable to yield silver ion, a compound ionizable to yield oxalate ion and a peroxygen compound, and in the absence of substantial amounts of gaseous oxygen.

4. The method which comprises polymerizing a monomeric material comprising vinyl chloride in an aqueous medium comprising silver nitrate, ammonium oxalate and a peroxygen compound, and in the absence of substantial amounts of gaseous oxygen.

5. The method which comprises polymerizing vinyl chloride in an aqueous medium comprising silver nitrate, ammonium oxalate and potassium persulfate, and in the absence of substantial amounts of gaseous oxygen.

6. The method which comprises polymerizing a monomeric material comprising vinyl chloride and an alkyl acrylate in an aqueous medium comprising silver nitrate, ammonium oxalate and potassium persulfate, and in the absence of substantial amounts of gaseous oxygen.

GRANT W. SMITH.

No references cited.

Certificate of Correction

Patent No. 2,473,549            June 21, 1949

GRANT W. SMITH

It is hereby certified that errors appear in the printed specification of the above numbered patent requiring correction as follows:

Column 1, line 16, for "acetate" read *acetate*; column 3, line 58, for "persulfonate" read *persulfate*; column 4, line 27, for the words "in an" read *in a*; column 5, line 58, for "$CH_2=S\diagup\diagdown$" read $CH=C\diagup\diagdown$ columns 7 and 8, Table II, first line under the heading "Total'" for "71¼" read *71¾*; and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*